US010121477B2

(12) United States Patent
Peng (10) Patent No.: US 10,121,477 B2
(45) Date of Patent: Nov. 6, 2018

(54) VIDEO ASSISTED DIGITAL AUDIO WATERMARKING

(71) Applicant: ATI Technologies ULC, Markham (CA)

(72) Inventor: Tan Peng, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 174 days.

(21) Appl. No.: 15/359,931

(22) Filed: Nov. 23, 2016

(65) Prior Publication Data

US 2018/0144754 A1  May 24, 2018

(51) Int. Cl.

| | |
|---|---|
| *G10L 19/018* | (2013.01) |
| *G11B 27/036* | (2006.01) |
| *H04N 5/913* | (2006.01) |
| *H04N 21/8358* | (2011.01) |
| *H04N 21/233* | (2011.01) |
| *H04N 21/234* | (2011.01) |
| *H04N 21/845* | (2011.01) |
| *G11B 20/00* | (2006.01) |

(52) U.S. Cl.
CPC .......... *G10L 19/018* (2013.01); *G11B 27/036* (2013.01); *H04N 5/913* (2013.01); *H04N 21/233* (2013.01); *H04N 21/23418* (2013.01); *H04N 21/8358* (2013.01); *H04N 21/8456* (2013.01); *G11B 20/00891* (2013.01); *H04N 2005/91335* (2013.01)

(58) Field of Classification Search
CPC .... G10L 19/018; G11B 27/036; H04N 5/913; H04N 21/233; H04N 21/23418; H04N 21/8358; H04N 21/8456
See application file for complete search history.

(56) References Cited

U.S. PATENT DOCUMENTS

| | | | |
|---|---|---|---|
| 9,253,485 B2 | 2/2016 | Celik et al. | |
| 9,886,961 B2 | 2/2018 | Adsumilli | |
| 9,959,586 B1 | 5/2018 | Yu et al. | |
| 2003/0161468 A1* | 8/2003 | Iwagaki | H04N 5/913 |
| | | | 380/201 |
| 2006/0239501 A1 | 10/2006 | Petrovic et al. | |
| 2014/0245339 A1* | 8/2014 | Zhang | H04N 21/8358 |
| | | | 725/18 |

* cited by examiner

*Primary Examiner* — Mishawn N Hunter
(74) *Attorney, Agent, or Firm* — Meyertons Hood Kivlin Kowert and Goetzel PC; Rory D. Rankin (57) ABSTRACT

A system and method for embedding digital audio watermarks in audio source information based at least upon identified video content are described. An audio/video processing system receives audiovisual data. A video content analyzer within the system analyzes video source information of the audiovisual data, determines video content depicted by data in the video source information, and generates an indication of the video content. An audio watermark embedder of the system receives the indication, and based at least in part on the indication, adjusts watermark embedding parameters used for embedding the audio watermark in the audio source information.

17 Claims, 6 Drawing Sheets

Video and Audio Correlation Table 300

| Video Content | Audio Onset | Frequency Range | Sound Pressure Level | ... |
|---|---|---|---|---|
| ... | ... | ... | ... | ... |
| 5b01101 = "Human Whispering Dialogue" | 1b1 = "Yes" | 50Hz to 120Hz | 40dB to 50dB | |
| 5b01110 = "Human Shouting Dialogue" | 1b1 = "Yes" | 1KHz to 2KHz | 70dB to 80dB | |
| 5b01111 = "Unoccupied Room" | 1b0 = "No" | 20Hz to 40Hz | 30dB to 40dB | |
| 5b10000 = "View of Empty Road" | 1b0 = "No" | 20Hz to 40Hz | 30dB to 40dB | |
| 5b10001 = "Explosion" | 1b1 = "Yes" | 20Hz to 40Hz | 80dB to 100dB | |
| ... | ... | ... | ... | |

VIDEO ASSISTED DIGITAL AUDIO WATERMARKING

BACKGROUND

Description of the Relevant Art

Globally, consumers purchase multimedia data available in a digital format on a daily basis. The digital format allows the multimedia data to be stored on a variety of storage media such as high definition digital versatile discs (HD DVDs), Blue-ray discs, Flash storage and hard disk drives (HDDs). The multimedia data is accessed by hardware and software via multimedia players, computing devices and network connections. Providing the multiple components of the content depicted by the multimedia data is done with monitors displaying the video and text components, speakers playing the audio component and touchscreens detecting the interactive component.

The access of multimedia data provides the video, audio and interactive components for processing, which results in presenting the work of expression depicted by the components to a user. In many examples, the presenting includes playback of audiovisual data. The access of multimedia data also makes it possible for other steps to occur. These other steps provided by the access include copying, modifying and redistributing the multimedia data. Since some or all of these other steps include impermissible use of the multimedia data, the original source providers of the multimedia data use protection techniques.

Encryption of the multimedia data prevents access of the contents of the multimedia data without a proper decryption key. However, when the multimedia data is decrypted, it is possible the multimedia data is duplicated, modified and redistributed in an unauthorized manner. To enforce ownership of copyright of the multimedia data, digital audio watermarking is used to detect impermissible use. A digital audio watermark is unique information embedded in audio information in a manner that is difficult to remove. When the multimedia data is copied or modified, digital audio watermarking technology ensures the embedded unique information remains with the multimedia data.

Digital audio watermarking algorithms are characterized by a number of properties. A first property is the perceptible transparency, which is the acoustic difference perceptible to the human ear between the original audio component and the digital audio watermarked component. A second property is the robustness, which measures the resistance of the digital audio watermark to be modified or eliminated by processing from unauthorized users. A third property is the amount of data used by the digital audio watermark for indicating ownership of the multimedia data (e.g., copyright ownership). The amount of data for the audio watermark and the selected watermark algorithm used to embed the audio watermark affects the perceptible transparency. Although the multimedia data includes components other than audio data, such as video data, the digital audio watermarking algorithms use only audio data for making tradeoffs and decisions when providing a digital audio watermark.

In view of the above, efficient methods and systems for embedding digital audio watermarks are desired.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for embedding digital audio watermarks in audio source information based at least upon identified video content are contemplated. An audio/video processing system receives audiovisual information, which is part of multimedia information. The multimedia information corresponds to a multimedia product such as an interactive copy of a movie, an episode of a television series, a recording of a concert, a recording of a sporting event, an interactive video game and so forth. In various embodiments, the audio/video processing system includes at least a video content analyzer and an audio watermark embedder. The video content analyzer analyzes video source information of the audiovisual information and determines video content depicted by data in the video source information. Video content analysis technology performs shape recognition, motion detection, identification of objects, emotion recognition, scene change detection and so forth.

The video content analyzer generates identification of video content and provides the identification to the audio watermark embedder. The audio watermark embedder embeds information known as a watermark in the audio source information of the received audiovisual data to protect ownership of copyright of the audio source information. In response to receiving the identification of video content from the video content analyzer, the audio watermark embedder adjusts watermark embedding parameters used for embedding the audio watermark in the audio source information. In response to the adjustments of the watermark embedding parameters, the audio watermark embedder determines an amount of audio watermark data to embed in a given audio frame. In addition, in various embodiments the audio watermark embedder selects frequency components of the audio source information for embedding data of the audio watermark. Other parameters adjusted by the audio watermark embedder based on the identification of video content from the video content analyzer include the embedding strength, a number of states for amplitude modulation and an energy level threshold used for selecting frequency components of the audio source information.

The audio watermark embedder embeds the audio watermark in the audio source information and sends the embedded audio information to other components for further processing. For example, in some embodiments, the embedded audio information is resynchronized with the video information and later sent to a multimedia player for playback or stored on a storage medium. The use of the identification of video content aids the algorithms used by the audio watermark embedder when making tradeoffs during the embedding of the audio watermark.

Figure 1:
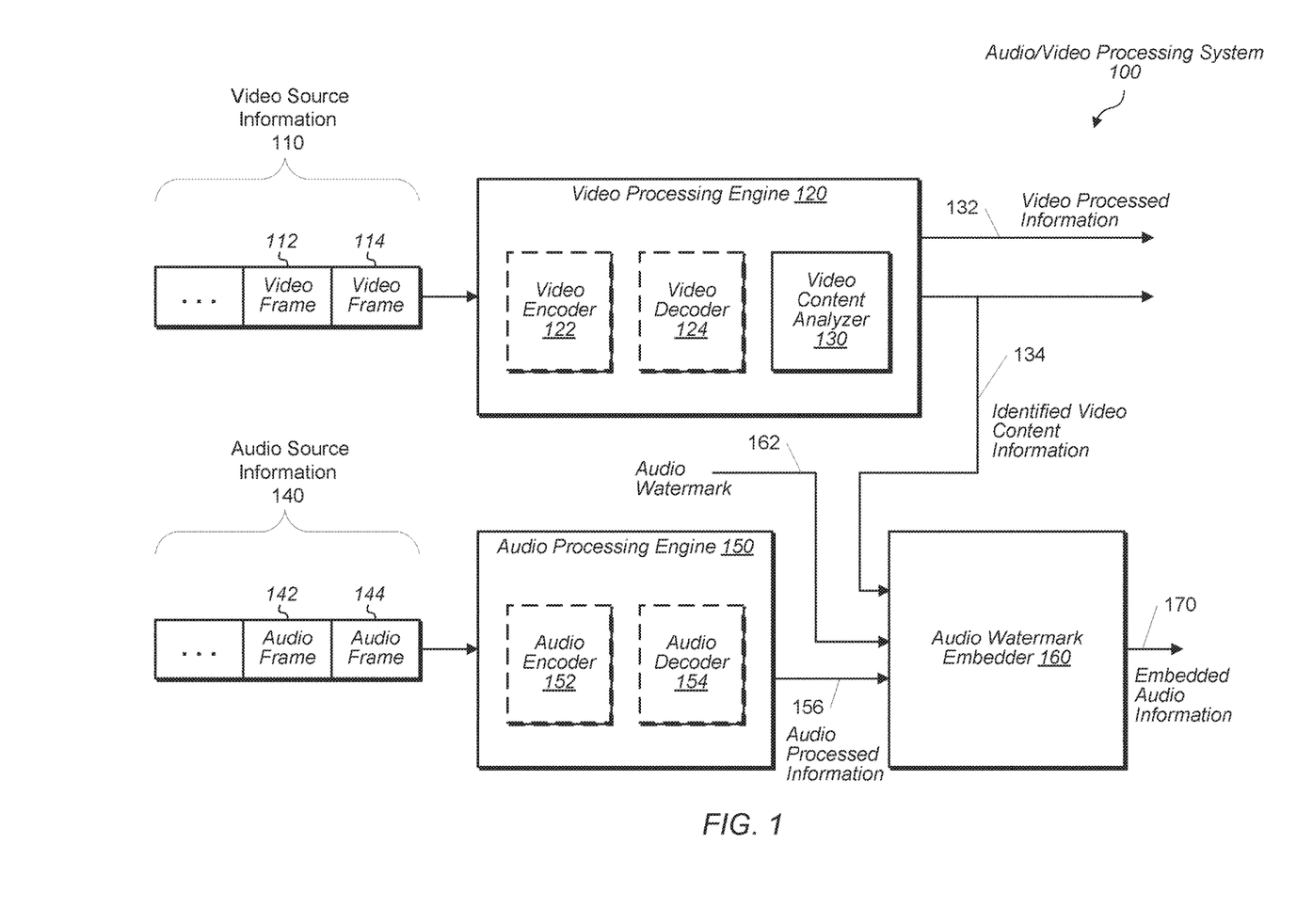
FIG. 1 is a generalized diagram of one embodiment of an audio/video processing system.

Turning to FIG. 1, a generalized block diagram of one embodiment of an audio/video processing system 100 is shown. As shown, the audio/video processing system 100 includes video processing engine 120, audio processing engine 150 and the audio watermark embedder 160. As shown, the audio watermark embedder 160 receives identified video content information 134, audio information 156 from the audio processing engine 150 and an audio watermark 162. In various embodiments, the audio watermark embedder 160 generates embedded audio information 170 from the received inputs 134 and 162. Therefore, the audio watermark embedder 160 uses solely video information for generating the embedded audio information 170. In other embodiments, the audio watermark embedder 160 generates embedded audio information 170 from the received inputs 134, 156 and 162. Therefore, the audio watermark embedder 160 uses a combination of video information and audio information for generating the embedded audio information 170. The use of the indication of the identified video content information 134 aids the algorithms within the audio watermark embedder 160 when making tradeoffs during the embedding of the audio watermark 162.

The video processing engine 120 receives video source information 110 as input data. In various embodiments, the video source information 110 is part of multimedia information of a multimedia product. The video source information 110 comes from a variety of sources such as Web streaming multimedia, high definition digital versatile discs (HD DVDs), Blue-ray discs and broadcast television. In various embodiments, the video source information 110 includes multiple video frames such as video frames 112-114. Each of the video frames 112-114 corresponds to a picture taken by a video camera. The video camera takes pictures at a given frame rate such as taking 30 pictures (frames) per second.

In some embodiments, the video source information 110 is in a compressed, or encoded, form to reduce both the amount of storage area used and the transmission rates for transferring the video source information 110. The compressed (encoded) form follows a predetermined format determining the organized layout of the data within a compressed video frame of frames 112-114. The predetermined format is based on the selected compression (encoding) algorithm. Examples of the compression format include Windows Media Video (WMV) format, the Moving Picture Experts Group (MPEG)-4 format, and the High Efficiency Video Coding (HEVC) format, which is also known as the H.265 format.

In some embodiments, the video decoder 124 receives the compressed video source information 110 and decodes it. In other embodiments, the video decoder 124 receives the compressed video source information 110 and partially decodes it to avoid full decoding and re-encoding (re-compressing) the video source information 110, which causes quality degradation as video compression is lossy. In some embodiments, the video source information 110 is in an uncompressed, which is a raw or a decoded form. In various embodiments, the video encoder 122 receives the compressed video source information 110 and encodes or compresses it. The encoded form is made available to the video decoder 124, the video content analyzer 130 or both for subsequent processing.

In some embodiments, the functionality of each of the video encoder 122, the video decoder 124 and the video content analyzer 130 is implemented in software. For example, a particular software application is used. Alternatively, programmable firmware is used. In other embodiments, the functionality of the components of the video processing engine 120 is implemented in hardware such as semiconductor circuitry. In yet other embodiments, the functionality is implemented by a combination of hardware and software.

The video content analyzer 130 receives video information, analyzes it, determines video content depicted by data in the video information 110 and generates an indication of the video content. The video content analyzer 130 receives a rendition of reality for humans in the form of the video source information 110 and translates it to a representation used by hardware and software for later processing, analyzing, categorizing or cataloging, presentation and so forth. In various embodiments, the rendition of reality presented in the video source information 110 includes shape recognition and motion detection. The representation includes an indication comprehended by the hardware and software. In various embodiments, the indication includes a binary encoding. The algorithms used by the video content analyzer 130 are able to identify objects and motion. More advanced algorithms additionally detect relationships between the objects and time, detect emotions, and associate timestamp values with the objects. The output of the video content analyzer 130 is used in many fields such as retail, security, flame and smoke detection, health-care and entertainment.

As shown, the video processing engine 120 provides an output referred to as the video processed information 132. In some embodiments, the video processed information 132 is sent to another hardware/software component for further processing. For example, the video processed information 132 is resynchronized with audio information, such as the embedded audio information 170, and later sent to a multimedia player for playback or stored on a storage medium. In addition, the video processing engine 120 provides the identified video content information 134. In some embodiments, the identified video content information 134 is also sent to another hardware/software component for further processing. Further, the audio watermark embedder 160 receives the identified video content information 134. In various embodiments, the identified video content information 134 includes indications representing objects, motion, relationships and so forth. In some embodiments, the indications are binary encodings representing the identified objects, motion, relationships and so forth depicted by the data in the video source information 110.

The audio processing engine 150 receives audio source information 140 as input data. In various embodiments, the audio source information 140 is part of multimedia information of a multimedia product. In various embodiments, the audio source information 140 includes multiple audio frames such as audio frames 142-144. Each of the audio frames 142-144 is associated with a corresponding one of the video frames 112-114.

Similar to the video source information 110, in some embodiments, the audio source information 140 is compressed according to a predetermined format. A variety of formats are available for compressing audio information such as the MPEG-4 format. The audio encoder 152 is used to encode audio information while the audio decoder 154 either fully or partially decodes compressed audio information. The audio processing engine 140 provides an output referred to as the audio processed information 152, which is sent to the audio watermark embedder 160.

The audio watermark embedder 160 enforces ownership of copyright of the audiovisual data by embedding the digital audio watermark 162 in the audio processed information 156. In various embodiments, the digital audio watermark 162 defines an author identifier, a serial number, a producer identifier, a distributor identifier and so forth. The identification information is encrypted with a watermark key to create a signature including a binary encoding known as the digital audio watermark 162. The audio watermark embedder 160 uses the identified video content information 134 to embed the digital audio watermark 162 in the audio processed information 156. For example, the audio watermark embedder 160 adjusts watermark embedding parameters used for embedding the audio watermark 162 in the audio processed information 156. In some embodiments, the adjusted watermark embedding parameters increase or decrease an amount of data (e.g., number of bits) of the digital audio watermark 162 to include in a given audio frame of the audio processed information 156.

In some embodiments, the adjusted watermark embedding parameters also increases or decreases the audio frequencies selected of components of the audio source information 156 for embedding data of the audio watermark 162. Further, in some embodiments, the adjusted watermark embedding parameters also dynamically change selection of the embedding strength, which changes the energy levels of the bits being embedded. In other embodiments, the adjusted watermark embedding parameters also include energy level thresholds and the number of states for amplitude modulation. The determination of the watermark embedding parameters is based at least in part on the received identified video content information 134. The audio watermark embedder 160 embeds the digital audio watermark 162 in the audio processed information 156 and outputs the embedded audio information 170 for further processing or storage.

Figure 2:
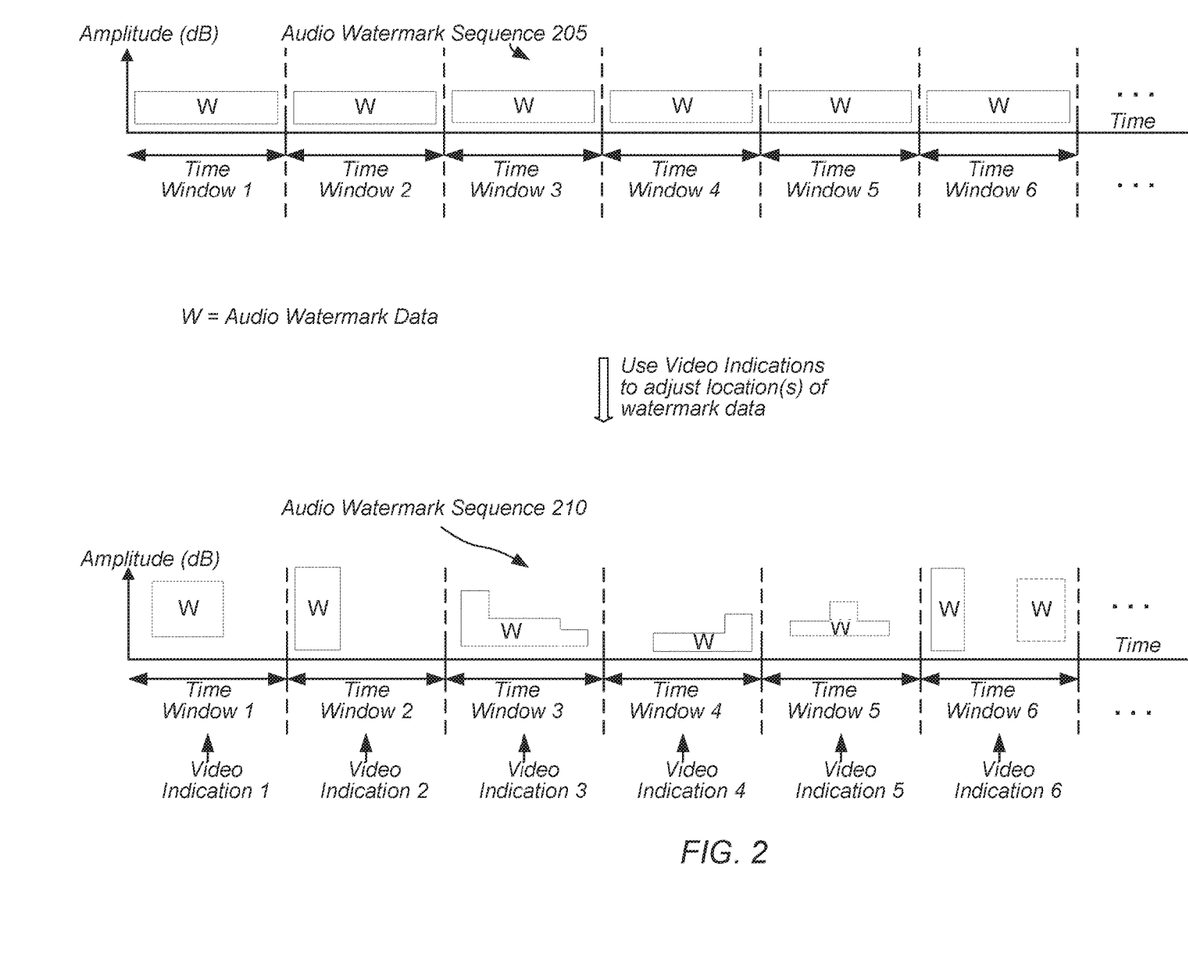
FIG. 2 is a generalized diagram of one embodiment of digital audio watermark sequences for indicating ownership of multimedia data.

Referring now to FIG. 2, one embodiment of digital audio watermark sequences for indicating ownership of multimedia data is shown. As shown, the x-axis indicates duration of time, which is divided into multiple time windows. In the embodiment shown, the first six time windows are shown. In various embodiments, each time window corresponds to hundreds or thousands of audio frames of audio source information. In some embodiments, the duration of each of the time windows 1-6 is selected by an arbitrary division of the total time duration of the audio source information. In other embodiments, the duration is selected based on a history of past embedding of watermarks. In yet other embodiments, the duration is selected by an external organization. A variety of methods for selecting the duration are possible and contemplated.

In various embodiments, a binary encoding identifies one or more of an author, a producer, an authorized distributor and so forth. The binary encoding is encrypted with a watermark key to create a signature, which is used as the digital audio watermark to embed in audio signals. In various embodiments, the digital audio watermark is embedded in an audio source signal during each time window. The audio watermark sequence 205 illustrates one embodiment of a sequence of digital audio watermarks embedded in an audio source signal. The energy level of the data of the embedded audio watermark is measured in units of decibels (dB). An embedding strength is related to the energy levels (e.g., magnitudes or amplitudes) and it is used to embed the audio watermark in the audio source signal.

In addition to the energy levels, the rectangles represent the amount of data of an audio watermark distributed across a given time window. In the embodiment shown, the audio watermark data in the sequence 205 is evenly distributed across the time windows. However, in other embodiments, the distribution of the audio watermark data is varied. The audio watermark sequence 205 is presented as a general distribution of audio watermark data which does not use any indication of video content of associated video information. For each of the audio frames within a given time window, the amount of data (e.g., number of bits of the binary encoding) of the audio watermark is selected without considering the video content in the associated video information (e.g., frame(s)).

Additionally, the energy level of the amount of data is selected without considering the video content in the associated video information. For example, each bit of the binary encoding of the audio watermark has an associated energy level for embedding. Further, the audio frequency for amount of data is selected without considering the video content in the associated video information. For example, each bit of the binary encoding of the audio watermark has an associated audio frequency for embedding. At least the number of bits, the associated energy levels and the audio frequencies used for embedding the audio watermark are selected while balancing perceptual transparency and robustness. However, the balancing is done without considering the video content in the associated video information.

As the audio watermark sequence 205 uses audio signal analysis with no aid from video source data in audiovisual data, the audio analysis suffers from an insufficient amount of data and complex processing in attempting to balance perceptual transparency and robustness. Therefore, the tradeoffs between perceptual transparency and robustness suffer. Either the audio watermark becomes audible or it becomes easier for attacks to remove it from the audio composite signal.

In contrast to the sequence 205, the audio watermark sequence 210 illustrates one embodiment of a sequence of digital audio watermarks embedded in an audio source signal that takes into consideration the associated video content. The same audio source signal is used for each of the audio watermark sequences 205 and 210. However, the video indications 1-6 are used to generate the audio watermark sequence 210. In some embodiments, each of the video indications 1-6 include distinct encodings within a respective time window. In other embodiments, one or more of the video indications 1-6 include the same encodings. In various embodiments, the video indications 1-6 include one or more binary encodings representing identified objects, motion, relationships, behavior, emotion and so forth depicted by video data of audiovisual data.

In the example shown, the number of bits, the associated energy levels and the audio frequencies used for embedding the audio watermark are selected based at least in part on the video content in the associated video information. Other embodiments may make decisions for fewer, more, and/or different properties of the watermark based at least in part on the video content. Additionally, these audio watermark parameters are selected while balancing perceptual transparency and robustness. In the embodiment shown, the audio watermark sequence 210 does not include uniform distributions of the data of the audio watermark within the time windows 1-6. For example, a scene change, an explosion, a fight, a car crash or other noisy and relatively loud event is depicted by the video data in the video source information at the beginning of the time window 2. The event ends and the video data depicts a relatively quiet scene afterward. Therefore, the majority if not all of the data of the audio watermark is placed in the beginning of the time window 2 to generally coincide with the event. Additionally, the energy levels of the data of the audio watermark are increased. Given then relatively high energy level of the event, an increase in the energy level of the watermark is possible as it may still be masked by the audio associated with event.

In some embodiments, the number of bits, the associated energy levels and the audio frequencies used for embedding the audio watermark are selected solely based on indications of video data (e.g., car crash, explosion, crashing of cymbals) depicted by the video source information. In other embodiments, the parameters used for embedding the audio watermark are selected by combining the indications of video data depicted by the video source information with results of analysis of the audio source information. In addition to time window 2, the audio watermark sequence 210 has varying audio watermark embedding parameters across the audio frames in the time windows 1-6. As shown in time window 6, in some embodiments, multiple audio watermarks are placed within a time window. When the initial audio watermark is placed in a concentrated subset of the time window and perceptual transparency is still able to be achieved, robustness is increased by placing more audio watermark data within the time window.

Figure 3:
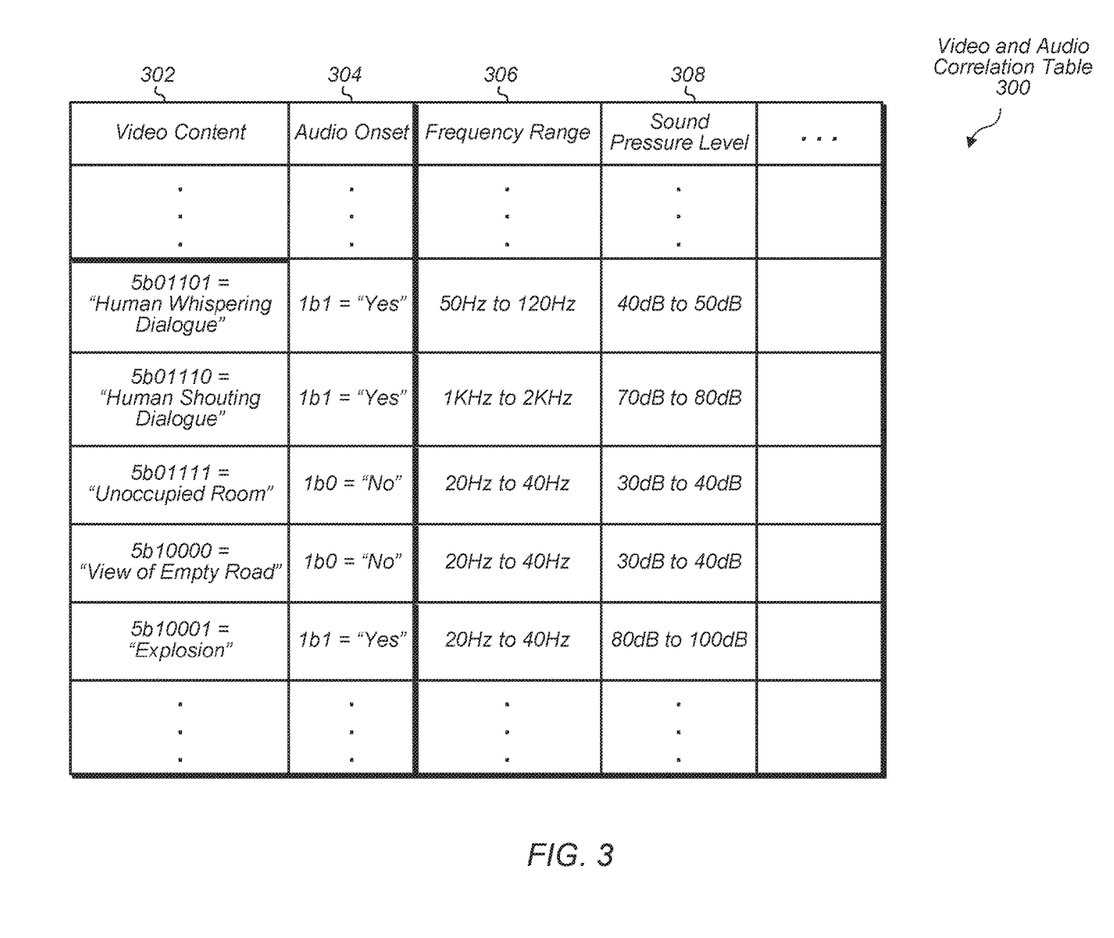
FIG. 3 is a generalized diagram of one embodiment of a video and audio correlation table.

Turning now to FIG. 3, one embodiment of a video and audio correlation table 300 is shown. In various embodiments, the table 300 is accessed when a video content analyzer provides an indication of video content depicted by video source information. For example, the video content analyzer provides one or more indications of video content depicted within a one or more video frames. The indications are used to index into the table 300. As shown, the table 300 includes multiple fields. Although the fields 302-308 are shown in contiguous order, in other embodiments, the information stored in the table 300 is stored in another order and in a noncontiguous manner.

In the embodiment shown, the field 302 stores a binary encoding of an indication of video content. The binary encodings represent identified objects, motion, relationships, behavior, emotion and so forth depicted by video data of audiovisual data. In other embodiments, the values in field 302 are decimal values which are later converted to binary representation. In yet other embodiments, any other numerical representation, such as hexadecimal or other, is used within field 302. As shown, different types of dialogue, an unoccupied room, a view of an empty road and an explosion are listed with encodings.

Each of the types of depicted video content has associated characteristics stored as additional data in the fields 304-308. For example, the field 304 stores an indication of whether the video content indicates an audio onset, such as an appreciable audio change from a previous scene. In some examples, audio onset occurs during scene changes. Field 306 stores an audio frequency range for the depicted video content. Field 308 stores a sound pressure level for the depicted video content.

In other embodiments, one or more weights are stored in a corresponding row of the table 300 to be used for determining the audio watermark embedding parameters. Rather than use absolute values stored in the fields 304-308, the weights indicate relative adjustments to make to the audio watermark embedding parameters for an audio frame corresponding to the video frame depicting the video content. In various embodiments, the values stored in the table 300 are solely used to determine the audio watermark embedding parameters. In other embodiments, the values stored in the table 300 are combined with results of analysis of the audio source information.

Figure 4:
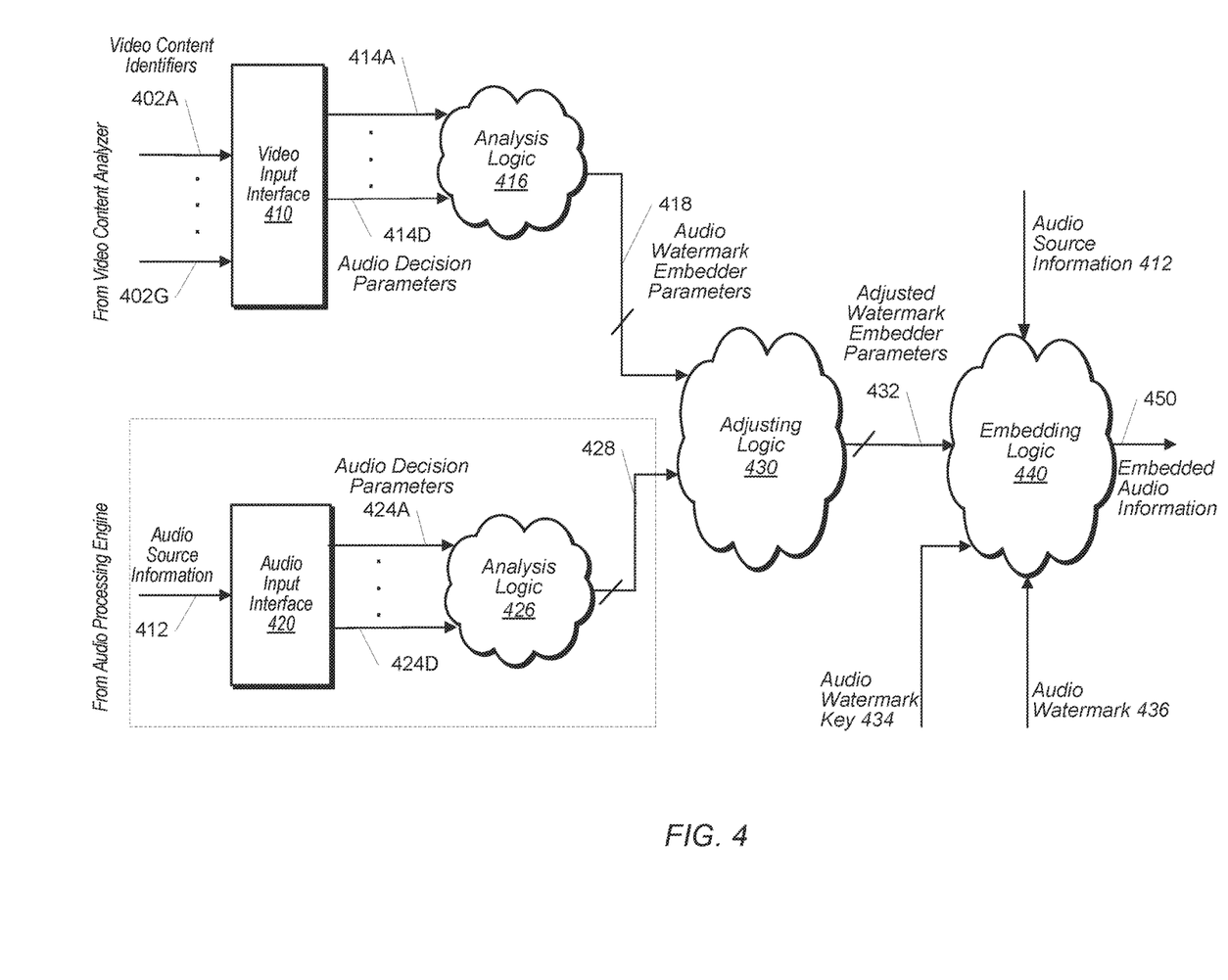
FIG. 4 is a generalized diagram of one embodiment of an audio watermark embedder.

Turning now to FIG. 4, a generalized block diagram of one embodiment of an audio watermark embedder 400 is shown. The audio watermark embedder 400 includes a video input interface 410 for receiving the video content identifiers 402A-402G. The audio watermark embedder 400 also includes the adjusting logic 430 and the embedding logic 440. The adjusting logic 430 and the embedding logic 440 are implemented in software, hardware or a combination. The audio watermark embedder 400 embeds a portion or all of the audio watermark 436 in the audio information 416 based at least upon the video content identifiers 402A-402G to provide the embedded audio information 450. The embedded audio information 450 provides protection of ownership of copyright of the received audio information 412.

In various embodiments, the video content identifiers 402A-402G include one or more encodings from a video content analyzer. In various embodiments, the encodings are binary encodings. The video content identifiers 402A-402G are used to identify video content depicted in video source information such as a person versus an inanimate object, an activity or event, situation awareness, a face, emotion, flame or smoke, behavior and so forth. In some examples, the video content identifiers 402A-402G indicate a type of person such as a doctor, a police officer, a farmer and so forth. In some embodiments, the video content analyzer provides an indication of a facial expression used to distinguish between kindness and malicious intent. In one example, a doctor entering a room with a look of concern indicates a quiet dialog is about to occur and does not indicate a significant change occurs for a particular duration of time. In another example, a cowboy entering a room with an angry expression indicates a fight is about to occur and a significant change in the audio information is about to occur. The combination of two or more of the type of person, the facial expression, the background, other persons and objects detected in the frame and the timestamp within the length of the video (e.g., a second act filled with conflict versus a first act filled with character introductions) provide situation awareness used to determine the audio watermark embedder parameters 432 used by the embedding logic 440.

As described earlier, the video content identifiers 402A-402G indicate locations in multimedia data where significant changes occur. In various embodiments, the video input interface 410 receives weighted values, encodings, or a combination, and additionally, a timestamp and/or a video frame index. The time stamp and/or video frame index identifies the video frame(s) associated with the video content identifiers 402A-402G, which are used to identify the associated audio frames for embedding the digital audio watermark.

Other examples of significant changes indicated by the video content identifiers 402A-402G include at least scene changes, object changes (e.g., person, vehicles, and animals), emotion changes, behavior changes, background changes, detection of smoke and fire, detection of sudden bright light or sudden darkness, motion changes and so forth. In various embodiments, the significant changes indicated by the video content identifiers 402A-402G span across multiple video frames and associated audio frames. The changes detected by the video content analyzer and characterized as numerical indications in various embodiments are used to determine the adjusted audio watermark embedder parameters 432 used by the embedding logic 440. As described earlier, the adjusted audio watermark embedder parameters 432 includes at least the amount of data (e.g., number of bits of the binary encoding) of the audio watermark, one or more audio frequencies used to embed the audio watermark, and one or more energy levels used for embedding the audio watermark.

In various embodiments, one or more tables similar to the earlier described table 300 are used to provide the video content identifiers 402A-402G as weighted values. In other embodiments, the video content identifiers 402A-402G are encodings used to index into other tables which provide weighted values used by the adjusting logic 430 to generate the audio watermark embedder parameters 432. In various embodiments, the video interface logic 410 sends audio decision parameters 414A-414D to other tables and logic within the analysis logic 416 to generate the audio watermark embedder parameters 418.

In various embodiments, each of the adjusting logic 430 and the embedding logic 440 use values generated solely from the video content identifiers 402A-402G received by the video interface 410. In other embodiments, the adjusting logic 430 and the embedding logic 440 use a combination of values generated from the video content identifiers 402A-402G and from the audio information 412. For example, the audio watermark embedder parameters 418 are adjusted by the adjusting logic 430 based on solely video content information or a combination of video and audio information of audiovisual data. With solely video information, in some embodiments, the adjusting logic 430 receives the audio watermark embedder parameters 418 for each of quiet dialogue, two persons and an office setting, but with also an indication of a scene change. Therefore, the adjusting logic 430 increases the amount of data for an audio watermark despite the quiet settings.

The adjusting logic 430 performs tradeoffs regarding the perceptual transparency of the embedded amount of data of the audio watermark 436, the amount of owner identification to include in the amount of data of the audio watermark 436 in a given audio frame and the robustness of the amount of data of the audio watermark 436 in the given audio frame. As the amount of data of the audio watermark 436 increases, such as a number of bits embedded per second increases, the robustness of the audio watermark 436 also increases, but the perceptual transparency decreases (audible distortion increases). This is one example of a tradeoff. Alternatively, the embedding logic 440 performs one or more of these tradeoffs.

In some embodiments, the audio watermark embedder 400 includes an audio input interface 420 for receiving the audio information 412. In various embodiments, the audio information 412 includes processed audio frames such as encoded (compressed) audio frames. The audio information 412 indicates the audio signals included in the audiovisual information of a multimedia product. In various embodiments, the audio information includes one or more audio signals segmented into frames which are further divided into components and further subbands based on a given transform algorithm. The transform algorithm transforms the audio source signals from the time domain to another domain. One of a variety of transform domains is selected. For example, the transform algorithm is one of a spread spectrum modulation (SSM) transformation algorithm, a discrete cosine transformation algorithm, a discrete wavelet transformation algorithm, a cepstrum transformation algorithm and so forth.

In some embodiments, the audio interface 420 provides the audio decision parameters 424A-424D to the analysis logic 426 for generating the audio watermark embedder parameters 428. The audio decision parameters 424A-424D include one or more of energy levels, audio signal frequencies, an indication of signal distortion and so forth. In other embodiments, the audio input interface 420 receives the audio decision parameters 424A-424D along with the audio information 412 as the processing is performed outside of the audio embedder 400.

In some embodiments, the adjusting logic 430 receives the video content identifiers 402A-402G and the audio decision parameters 414A-414D directly from the interfaces 410 and 420. In other embodiments, the interfaces 410 and 420 store the identifiers 402A-402G and the parameters 414A-414D in known locations for later access. As described earlier, when determining the adjusted audio watermark embedder parameters 432, in some embodiments, the adjusting logic 430 processes solely video information. In other embodiments, the adjusting logic 430 processes video information and audio information. The adjusted audio watermark embedder parameters 432 includes at least the amount of data (e.g., number of bits of the binary encoding) of the audio watermark 436, one or more audio frequencies used to embed the selected data of the audio watermark 436, and one or more energy levels used for embedding the selected data of the audio watermark 436.

The embedding logic 440 embeds the selected amount of data of the audio watermark 436 in the audio information 412 to provide the embedded audio information 450. In some embodiments, a watermark key 434 is used. The embedding logic 440 performs the embedding based on the adjusted audio watermark embedder parameters 432, which are dependent at least upon the video content identifiers 402A-402G.

Figure 5:
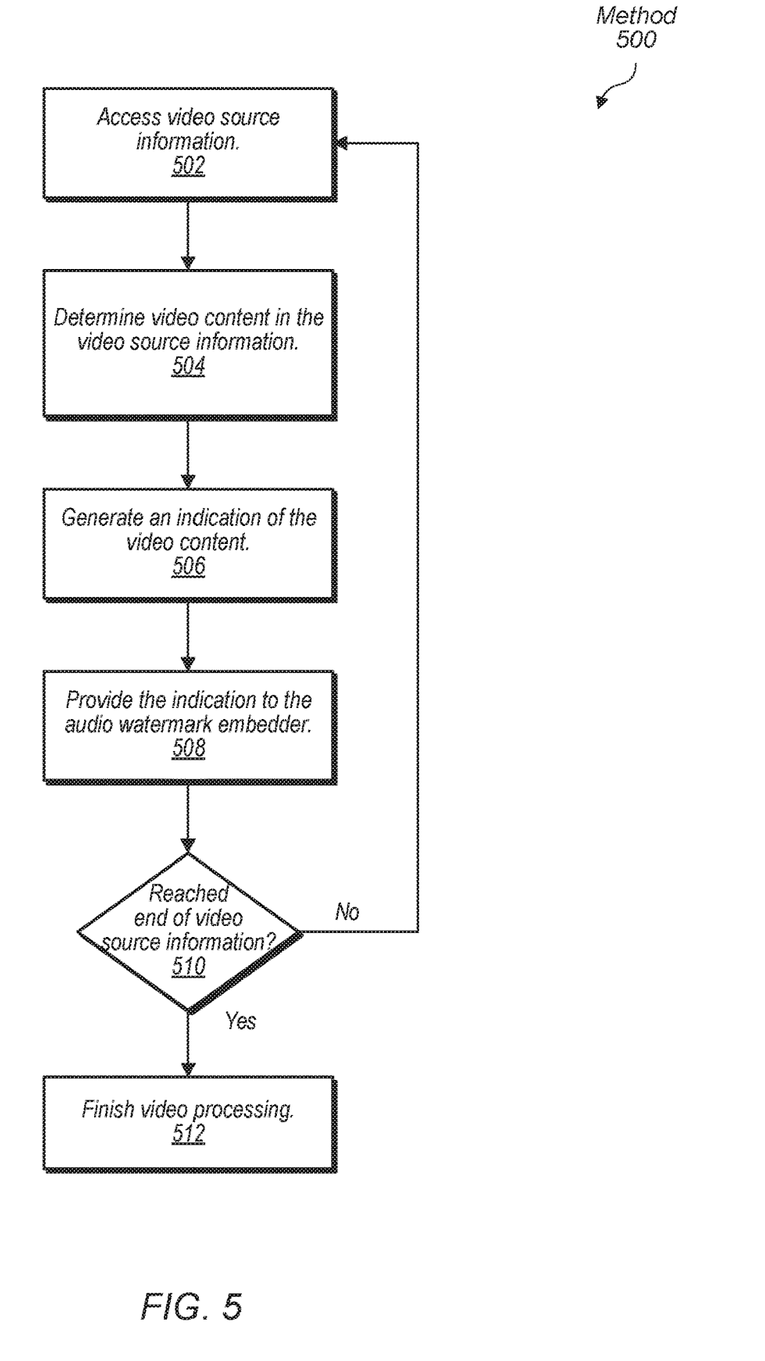
FIG. 5 is a generalized diagram of one embodiment of a method for identifying video content depicted by data in a video frame for use by an audio watermark embedder.

Referring now to FIG. 5, one embodiment of a method 500 for identifying video content depicted by data in a video frame for use by an audio watermark embedder is shown. For purposes of discussion, the steps in this embodiment (as well as in FIG. 6) are shown in sequential order. However, in other embodiments some steps occur in a different order than shown, some steps are performed concurrently, some steps are combined with other steps, and some steps are absent.

In various embodiments, audiovisual information is part of multimedia information. The multimedia information corresponds to a multimedia product such as an interactive copy of a movie, an episode of a television series, a recording of a concert, a recording of a sporting event, an interactive video game and so forth. An audio/video processing system receives the audiovisual information. The audio/video processing system accesses the video source information of the audiovisual information (block 502).

In some embodiments, the audiovisual information is stored in a known location and later accessed. In other embodiments, the audiovisual information is sent from a processing component such as processing unit on a video camera.

In various embodiments, the audio/video processing system includes a video content analyzer. The video content analyzer is used to determine video content depicted by data in the video source information (block 504). A variety of methods are used by algorithms implemented by the video content analyzer. A few examples include content-based temporal sampling of video frames, methods including Markov Random Field (MRF) model which captures spatial and temporal coherence of moving objects, and video summarization and video skimming abstraction techniques.

In various embodiments, the video content analyzer includes more advanced capabilities such as video tracking, egomotion estimation, identification of particular persons or characters, identification of events or activities, identification of the start and end of dialog, situation awareness, behavior and/or emotion analysis of people and animals, and scene change detection. A scene change generally includes abrupt transitions between shots, gradual transitions between shots resulting from video editing modes, and inter-shot changes caused by camera operations.

The video content analyzer uses the above algorithms to identify video content depicted by data in the video source information. In various embodiments, the video content analyzer generates an indication of the video content (block 506). The video content analyzer encodes the identified content with associated identifiers. For example, in various embodiments, mappings to given encodings are used. In various embodiments, multiple binary encodings are used as an entity has multiple characteristics. In one example, a character identified as "John" is determined to be upset in the morning and engages in a loud discussion at a restaurant where tables are overturned. In a later scene, the same character "John" is determined to be calm on a beach at night and has a quiet talk with his wife. Multiple different encodings are associated with the character "John" along with associated timestamp values and/or video frame indices.

In various embodiments, the algorithms used by the video content analyzer segment the video source information, extract features and use statistics and machine learning or artificial intelligence training techniques to determine relationships, behavior and emotions. The video content analyzer provides the indications to other processing stages such as cataloging and indexing processes, customer satisfaction analysis processes, surveillance processes and so on. In some embodiments, the video content analyzer sends the indications to components for the further processing. In other embodiments, the video content analyzer sends the indications to a storage medium for storage and later access. Another example of further processing is embedding audio watermark information in audio information. The video content analyzer also provides the indication to an audio watermark embedder (block 508). Similar to the video source information, the audio/video processing system accesses the audio source information of the audiovisual information.

In various embodiments, the video source information includes multiple video frames. In some embodiments, the processing of the video source information is performed on each video frame. In other embodiments, the processing of the video source information is performed on selected video frames in order to save time and storage space as well as reduce processing time. If the end of the video source information, such as the last video frame to process, is not yet reached ("no" branch of the conditional block 510), then control flow of method 500 returns to block 502. Otherwise, the end of the video source information is reached ("yes" branch of the conditional block 510), and the video processing is completed (block 512).

Figure 6:
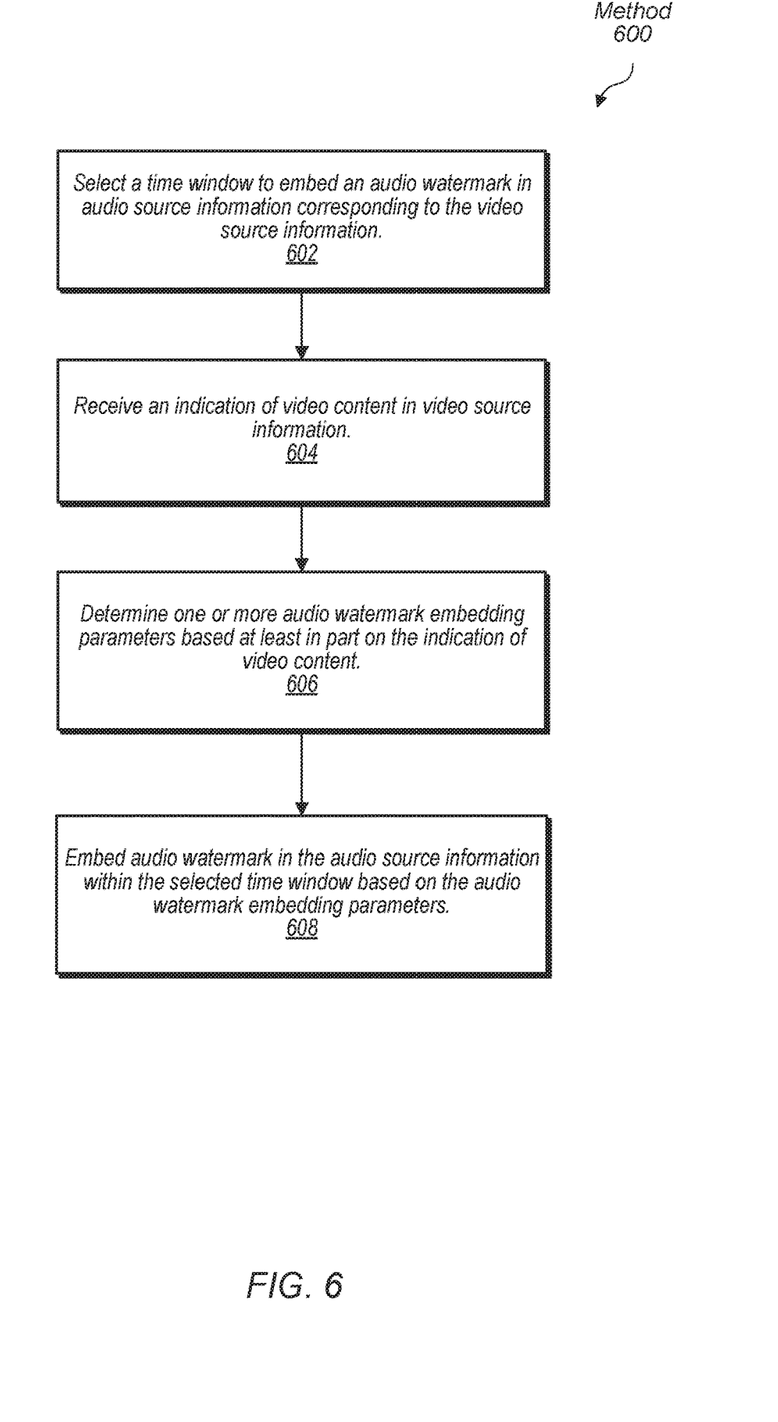
FIG. 6 is a generalized diagram of one embodiment of a method for embedding audio watermark information in audio data based at least upon identified video content.

Referring now to FIG. 6, one embodiment of a method 600 for embedding audio watermark information in audio data based at least upon identified video content is shown. A time window is selected to embed an audio watermark in audio source information corresponding to video source information (block 602). In some embodiments, the duration of time windows is selected by an arbitrary division of the total time duration of the audio source information. In other embodiments, the duration is selected based on a history of past embedding of watermarks. In yet other embodiments, the duration is selected by an external organization. A variety of methods for selecting the duration of the time windows are possible and contemplated.

An indication of video content depicted by data in a video frame is received (block 604). As described earlier, the indication identifies where in the video source information significant changes are introduced which affects audio watermark embedding. The audio watermark embedding parameters are determined based at least in part on the indication(s) of video content (block 606). At least the number of bits of the digital audio watermark, the associated energy levels and the audio frequencies used for embedding the digital audio watermark are selected while balancing perceptual transparency and robustness. The audio watermark embedding parameters indicate placing more data of the audio watermark in audio frames corresponding to higher energy levels of audio information as indicated by the indications of video content (e.g., a car crash, a fight, an explosion). Similarly, audio watermark embedding parameters indicate placing less data of the audio watermark in audio frames corresponding to lower energy levels of audio information as indicated by the indications of video content (e.g., whispering or no dialogue, uninhabited landscape or room). The audio watermark data is embedded in the selected audio frame based at least in part on the audio watermark embedding parameters generated from the indications of video content (block 608).

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An audio watermarking embedder comprising: an interface configured to receive an identification of video content represented by data in a video frame; and control logic configured to: select a watermark embedding parameter used for embedding an audio watermark in an audio frame based at least in part on the identification of video content; embed the audio watermark in an audio frame corresponding to the video frame based at least in part on the selected watermark embedding parameter; embed a first amount of data of the audio watermark in the audio frame based at least in part on detecting the identification of video content represents a first scene; and embed a second amount of data different from the first amount of data of the audio watermark in the audio frame based at least in part on detecting the indication of video content represents a second scene different from the first scene.

2. The audio watermarking embedder as recited in claim 1, wherein the control logic is further configured to:
   embed the audio watermark in the audio frame with a first energy level based at least in part on detecting the identification of video content represents a first scene; and
   embed the audio watermark in the audio frame with a second energy level different from the first energy level based at least in part on detecting the identification of video content represents a second scene different from the first scene.

3. The audio watermarking embedder as recited in claim 1, wherein the control logic is further configured to:
   embed the audio watermark in the audio frame at a first audio frequency based at least in part on detecting the identification of video content represents a first scene; and
   embed the audio watermark in the audio frame at a second audio frequency different from the first audio frequency based at least in part on detecting the identification of video content represents a second scene different from the first scene.

4. The audio watermarking embedder as recited in claim 1, wherein identifying the video content comprises:
   analyzing the data in the video frame; and
   determining the data depicts one or more video objects.

5. The audio watermarking embedder as recited in claim 4, wherein identifying the video content further comprises associating each of the one or more video objects with a corresponding category of a plurality of categories.

6. The audio watermarking embedder as recited in claim 1, wherein the control logic is further configured to combine the identification of video content with one or more audio decision parameters prior to embedding the audio watermark in the audio frame.

7. The audio watermarking embedder as recited in claim 6, wherein the audio decision parameters comprise one or more of a frequency of a subband and an energy level of a subband.

8. A method comprising: receiving an indication identifying video content depicted by data in a video frame; selecting a watermark embedding parameter used for embedding an audio watermark in an audio frame based at least in part on the identification of video content; embedding the audio watermark in an audio frame corresponding to the video frame based at least in part on the selected watermark embedding parameter; embedding a first amount of data of the audio watermark in the audio frame based at least in part on detecting the identification of video content represents a first scene; and embedding a second amount of data different from the first amount of data of the audio watermark in the audio frame based at least in part on detecting the indication of video content represents a second scene different from the first scene.

9. The method as recited in claim 8, further comprising:
   embedding the audio watermark in the audio frame with a first energy level based at least in part on detecting the identification of video content represents a first scene; and
   embedding the audio watermark in the audio frame with a second energy level different from the first energy level based at least in part on detecting the indication represents a second scene different from the first scene.

10. The method as recited in claim 8, further comprising:
    embedding the audio watermark in the audio frame at a first audio frequency based at least in part on detecting the identification of video content represents a first scene; and
    embedding the audio watermark in the audio frame at a second audio frequency different from the first audio frequency based at least in part on detecting the identification of video content represents a second scene different from the first scene.

11. The method as recited in claim 8, wherein the identifying the video content comprises:
    analyzing the data in the video frame; and
    determining the data depicts one or more video objects.

12. The method as recited in claim 11, wherein identifying the video content further comprises associating each of the one or more video objects with a corresponding category of a plurality of categories.

13. The method as recited in claim 8, wherein the control logic is further configured to combine the identification of video content with one or more audio decision parameters prior to embedding the audio watermark in the audio frame.

14. The method as recited in claim 13, wherein the audio decision parameters comprise one or more of a frequency of a subband and an energy level of a subband.

15. An audio/video processing system comprising: a video content analyzer; and an audio watermarking embedder; wherein the video content analyzer is configured to: analyze data in a video frame; identify video content depicted by the data; and generate an indication of the video content; and wherein the audio watermarking embedder is configured to: receive the indication of the video content; select a watermark embedding parameter used for embedding an audio watermark in an audio frame based at least in part on the identification of video content; and embed the audio watermark in an audio frame corresponding to the video frame based at least in part on the selected watermark embedding parameter; embed a first amount of data of the audio watermark in the audio frame based at least in part on detecting the identification of video content represents a first scene; and embed a second amount of data different from the first amount of data of the audio watermark in the audio frame based at least in part on detecting the indication of video content represents a second scene different from the first scene.

16. The audio/video processing system as recited in claim 15, wherein the audio watermarking embedder is further configured to:
embed the audio watermark in the audio frame with a first energy level based at least in part on detecting the identification of video content represents a first scene; and
embed the audio watermark in the audio frame with a second energy level different from the first energy level based at least in part on detecting the indication represents a second scene different from the first scene.

17. The audio/video processing system as recited in claim 15, wherein the audio watermarking embedder is further configured to:
embed the audio watermark in the audio frame at a first audio frequency based at least in part on detecting the identification of video content represents a first scene; and
embed the audio watermark in the audio frame at a second audio frequency different from the first audio frequency based at least in part on detecting the identification of video content represents a second scene different from the first scene.

* * * * *